April 13, 1965  M. DAVIS  3,177,637
AIR FILTERS
Filed Nov. 10, 1960  4 Sheets-Sheet 2

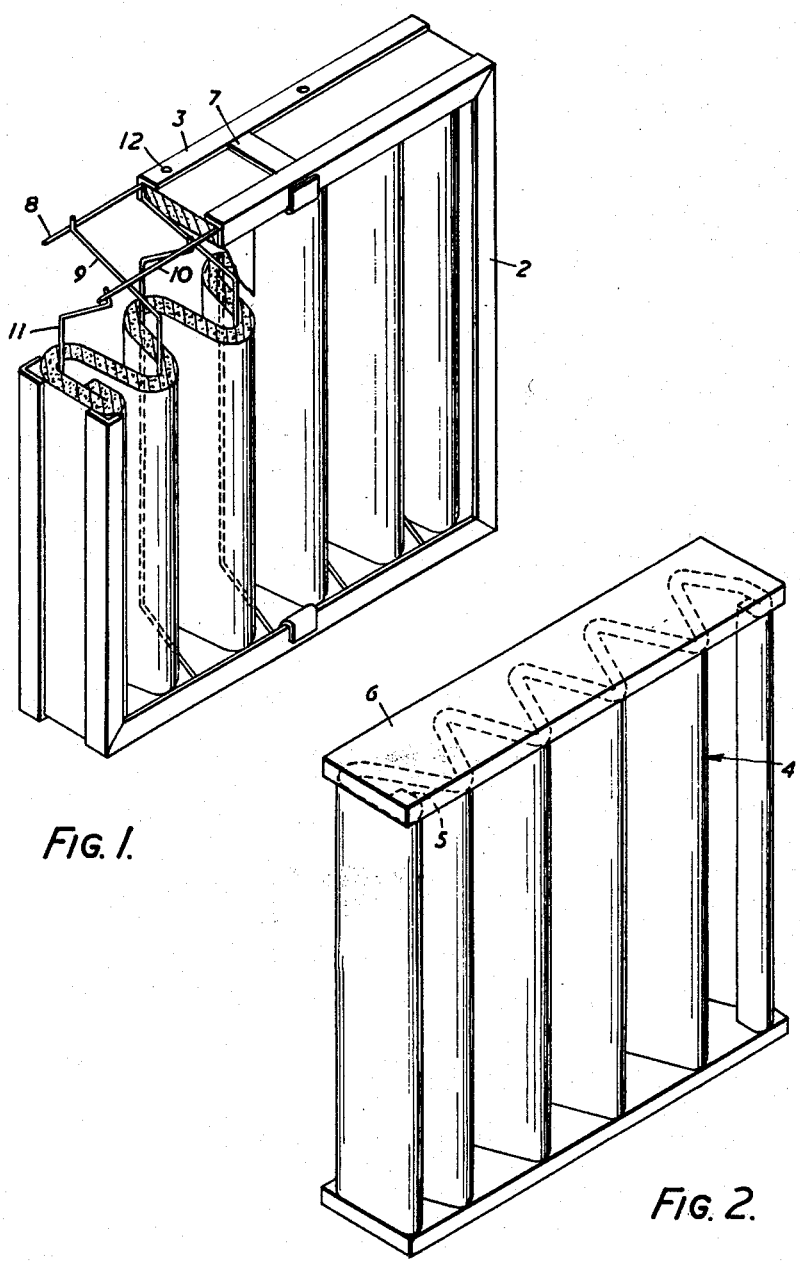

INVENTOR
M. Davis
BY
ATTORNEYS

April 13, 1965    M. DAVIS    3,177,637
AIR FILTERS

Filed Nov. 10, 1960    4 Sheets-Sheet 3

INVENTOR
M. Davis
BY
ATTORNEYS

April 13, 1965  M. DAVIS  3,177,637
AIR FILTERS
Filed Nov. 10, 1960  4 Sheets-Sheet 4

INVENTOR
M. Davis
BY
ATTORNEYS

| United States Patent Office | 3,177,637 |
| --- | --- |
| | Patented Apr. 13, 1965 |

3,177,637
AIR FILTERS
Maurice Davis, 31 Parsons Mead, West Croydon,
Surrey, England
Filed Nov. 10, 1960, Ser. No. 68,461
Claims priority, application Great Britain, Nov. 12, 1959,
38,418/59
8 Claims. (Cl. 55—483)

This invention is concerned with improvements in and relating to filters more particularly for filtering air. Air filtering may be required for example in air conditioning systems for office buildings, for factories or for closed circuit systems, such for example as air supply systems for electric motors.

In British Patent No. 873,130 there is described a filter material which is highly satisfactory in that it is cheap, efficient and easily cleaned. This material is air permeable foamed synthetic plastic, is resiliently deformable and is made up as a corrugated sheet, the corrugations being held by side pieces secured to the opposite edges of the sheet, the side pieces themselves also being of air permeable synthetic plastic.

The present invention has for its object the provision of filter equipment which is easy to load and unload for cleaning and replacement of the filter material and is particularly suited for incorporating the air permeable synthetic plastic filter material above mentioned.

According to the present invention there is provided a filter comprising a passage for the fluid to be filtered, a body of resiliently deformable filtering material located across said passage and against the periphery thereof and means retaining said body in position across said passage and under compression where it abuts the periphery to urge the material into sealing engagement with the periphery of the passage.

According to the present invention there is also provided a filter comprising a first member which defines a passage for the fluid to be filtered, a body of resiliently deformable filtering medium located across the frame, a second member to that side of the body remote from the first member and means urging the first and second members toward one another to locate the body and hold it in a state of compression where it abuts the first member.

In order that the present invention may be well understood there will now be described some embodiments thereof, given by way of example only, reference being had to the accompanying drawings in which FIGURE 1 is a perspective view partly sectioned of a filter unit;

FIGURE 2 is a perspective view of the filter element of a filter unit;

Figure 3:
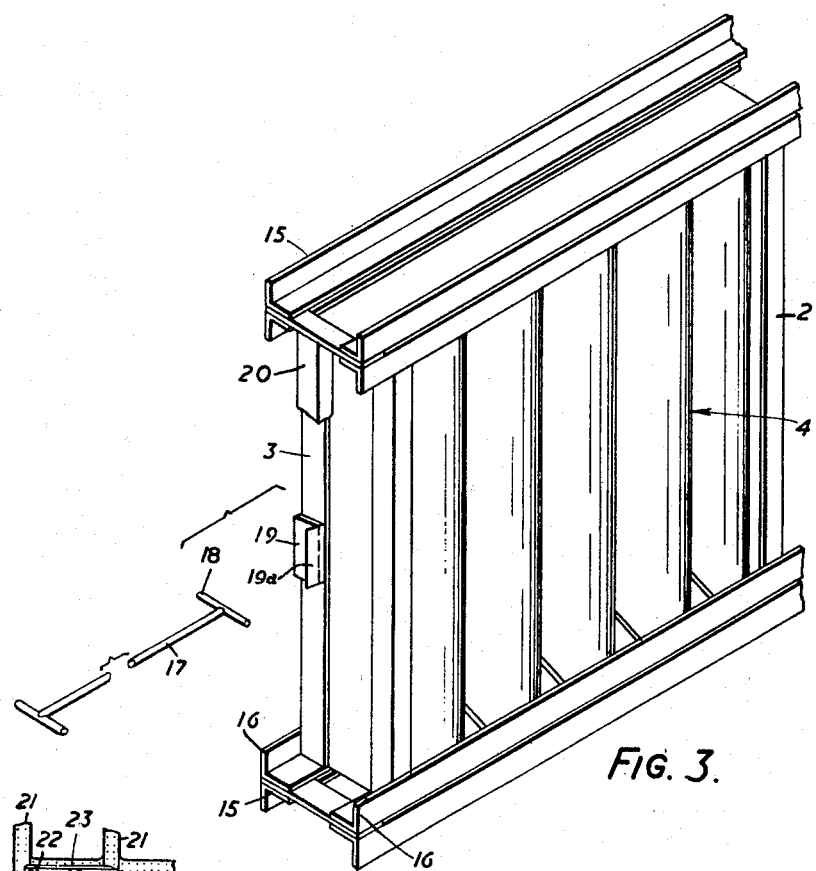
FIGURE 3 is a perspective view of a filter unit mounted in a frame for side loading.

Referring to FIGURE 1, a filter unit comprises a body 1 of resiliently deformable filter material located between a first frame 2 and a second frame 3. The filter material is preferably of foamed synthetic plastic treated to render it permeable to air. The unit may be made up as shown in FIGURE 2 in the form of a main sheet 4 which is corrugated, the free edge at each end of the corrugations being turned in as shown at 5, and the corrugations being maintained by side pieces 6 of the same material as the main sheet and secured to it by means of adhesive. This basic filter unit may be mounted over, for example an air passage, in which event the frame 3 may be secured across the passage and in sealing engagement with the periphery of the passage, and frame 2 is secured by means of clips 7 which hold the two frames at such spacing from one another that at the periphery of the filter material that material is kept under compression which causes it to seat against the frame 3 in such a manner that air will not be able to pass between the external surface of the filter material and the frame. In the embodiment shown in FIGURE 1 the two frames are of L-section and a support is provided for the filter material to keep the corrugated form during operation. This support comprises a pair of wire frameworks which are made up of a pair of parallel members 8 disposed at opposite sides of the frame 3, and to those members 8 are secured sufficient bridge members 9 to engage in each of the valleys of the main sheet 4. The other support has its pair of parallel members 10 disposed in opposite sides of the frame 2 and its bridge members 11 disposed in the valleys of the main sheet 4 which are directed towards the frame 2. Conveniently the supports are held in their respective frames by ears 12 pressed out of the frame. Alternatively, the supports may be brazed or welded to their respective frames. The clip 7 is formed so as to hinge about a member 8 and its other end is of U-section to engage the inwardly directed flange of the frame 2. It will be understood that since the filter material is resiliently deformable, each clip may be pressed inwardly of the frame in order to disengage the U-shaped part from the frame 2.

Instead of mounting a filter unit as a single unit provision may be made for mounting a number of filter units as an assembly. Thus, in FIGURE 3, there is shown an arrangement in which a number of side by side filter units may be mounted across an air passage. This assembly comprises a pair of channels 15 whose flanges 16 are spaced apart sufficiently to allow a filter unit to be moved there along but only with the filter material in its compressed state adjacent the frames. To move a unit into and out of the pair of channels a tool 17 having cross heads 18 is provided, the cross heads being of such dimension that when a cross head is parallel with the two frames it may be passed therebetween, and when turned through 90° will engage the two frames to allow the unit to be drawn along the channels. Additionally, in such an arrangement, in order that adjacent filter units may be moved together a hook-like flange 19 is provided on the frame 3 which will engage an oppositely handed hook-like flange 19a on an adjacent unit. Where such flanges are provided it is preferred to provide between adjacent filter units a strip 20 of any suitable material to prevent passage of unfiltered air between adjacent units, those strips preferably being of a material similar to that of the main sheet 4.

Figure 4:
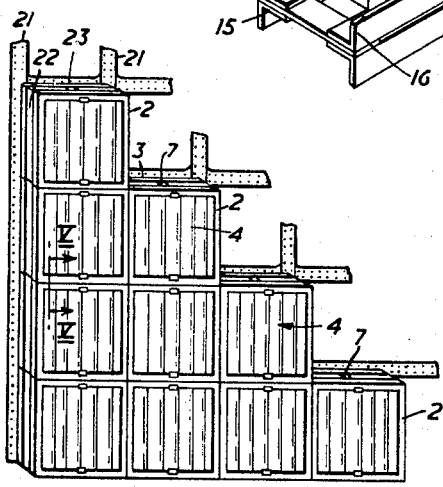
FIGURE 4 is a perspective view of a filter assembly arranged for front loading.
Figure 5:
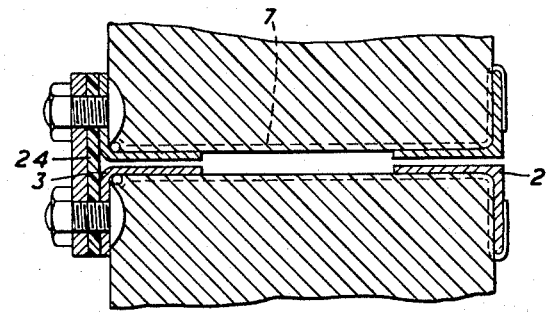
FIGURE 5 is a section on the line V—V of FIGURE 4.

In another construction, FIGURE 4, to provide a filter assembly a lattice may be built up of a number of parallel strips 21 and a number of transverse parallel strips 22. This lattice is constructed across the air passage and filter units are secured to the lattice with the frames 3 surrounding the openings in the lattice and the frames 2 secured by clips 23, of the kind mentioned with reference to FIGURE 1. In order to ensure sealing engagement of the frames 3 with the lattice a sealing strip 24 (FIGURE 5) is provided on each of the strips 21 and 22 and the frames 3 are bolted on to the strips with the sealing strip sandwiched between the frames 3 and the strips.

Figures 7, 9:
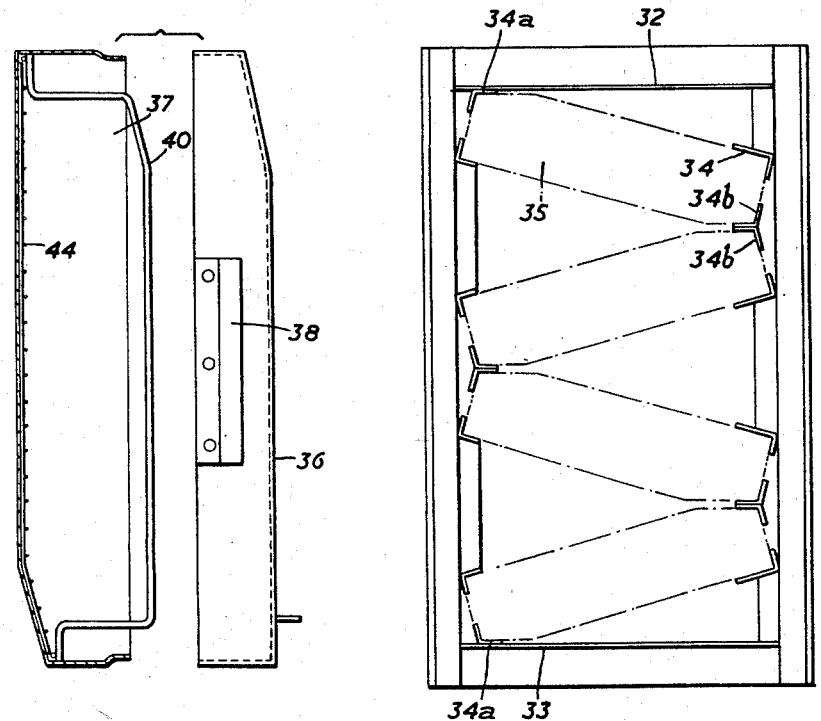
FIGURE 7 is an exploded view of the same filter unit from another side.
FIGURE 9 is a section taken through the centre of the assembly of FIGURE 8.
Figure 6:
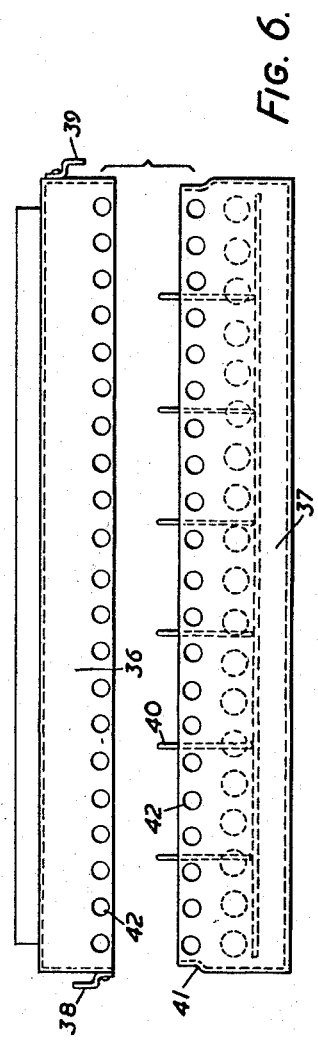
FIGURE 6 is an exploded side elevation of another embodiment of filter unit frame members.
Figure 8:
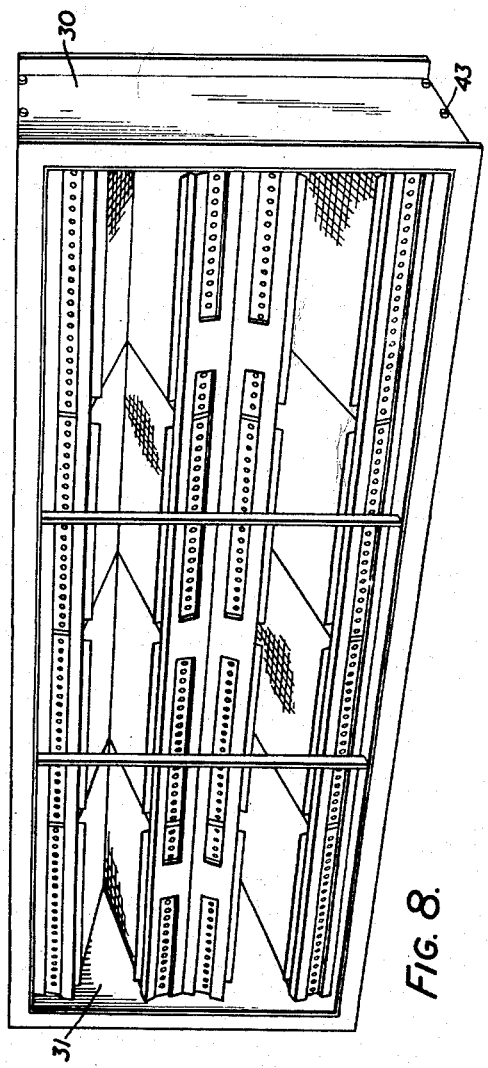
FIGURE 8 is a perspective view of a filter assembly for side loading.

In another arrangement of side loading, that is to say, in which the filter units are moved along a path parallel with their major faces, such as in the arrangement of FIGURE 3, a casing is provided as illustrated in FIGURES 8 and 9. This casing is of generally parallelopiped form, being closed about one periphery. Thus, the casing comprises closed ends 30, 31, closed top and bottom 32, 33. Extending between the ends of the casing are supports 34 which will support a number of rows 35 of side by side filter units. The uppermost and lowermost supports 34a are in sealing engagement with the top and bottom of the casing respectively, and the supports are arranged so that each row is at an angle to expose one face of the row to one of the open sides of the casing and the other face of the row to the other open side of the casing. With this configuration, adjacent rows are spaced at one open side of the casing and are in close proximity at the other side of the casing. The supports at that side of the casing where adjacent rows are in close proximity are in sealing engagement with one another, thus the supports 34b are formed as angle members whose adjacent arms are, for example, tack welded to one another. It will be seen therefore that when the filter units are in position extending from end to end of the casing, air may only pass through one open side of the casing to the other open side by way of the filter material. It will be noticed that in the construction illustrated the supports 34a and 34b are of an obtuse angle, this construction being adopted in order to fit a given number of units into a given size of casing. The filter units in this assembly are illustrated in FIGURES 6 and 7 and comprise frames 36 and 37 which are once again of L-section but each include one side which is of a greater angle than L-section in order to mate with the supports 34a and 34b. Once again these frames are provided with hook-like flanges 38, 39 of opposite hand to couple with an adjacent unit, and include one support 40 for the main sheet of FIGURE 1. Further the frames 36 and 37 are formed in order to engage one with the other. Thus, the frame 37 has an inwardly directed step 41 so that the periphery of the frame 37 will be received within the frame 36. Nonetheless, the supports 34 are spaced at such a distance that the frames 36 and 37 of a filter unit will be maintained in a position relative to one another in which the filter material is under compression at the periphery of the frames. Since the frames in this embodiment engage with one another, it may be desirable on those sides of the frames which will be directed towards the open sides of the casing to provide apertures 42 to allow air to enter the filter material and leave that material by way of the side members of the filter material in addition to the main faces of the main sheet. Referring again to FIGURE 8, the end 30 is releasably secured to the casing by means of bolts 43 to allow access to the filter units for withdrawal. It will also be seen from FIGURES 6 and 7 that a mesh 44 is provided in one of the frames to prevent passage of large particles to the filter material.

As in the arrangement of FIGURE 3, in view of the provision of the hook-like flanges, strips of material are located between individual filter units.

It will be appreciated that where coupling arrangements in the form of hook-like flanges are provided, the units must be loaded in correct orientation relative to one another. It may be desired to provide additional means for ensuring that units are loaded with their faces correctly directed, e.g. where a unit is removed after a period of operation and is reloaded without cleaning. In FIGURE 9 it will be seen that lugs 45 are provided on certain supports and a flange 46 on the frame 36 (FIGURE 7). By this means and the shape of the frames, the units can only be loaded one way round.

The filter units above described are simple, robust and of a construction which allows easy mounting of the units as an assembly for side loading or front loading, easy withdrawal of the filter material from a filter unit for cleaning purposes, and maintain close contact between the filter material and the frames, and in the case of side loading good contact between the frames and their channels or supports due to the compression of the filter material.

I claim:

1. A filter comprising a porous sheet folded to form parallel corrugations extending from one of two opposite edges of said sheet to the other, side pieces secured to said opposite sheet edges and bridging and secured to the ends of said corrugations, the portions of said sheet adjacent its remaining edges forming with said side pieces a peripheral wall of said sheet, both said sheet and side pieces being made of a resilient compressible filter material and forming together a body having two main faces surrounded and spaced by said peripheral wall, a frame comprising a pair of separable frame means peripherally surrounding said main faces, said peripheral wall being sandwiched between said frame means, and means releasably connecting said separable frame means and retaining them at a distance from each other less than the uncompressed thickness of said side pieces taken in a direction perpendicular to said main faces, thereby compressing said side pieces between said frame means to restrict the passage of fluid between said side pieces and frame means.

2. A filter as claimed in claim 1 in which said remaining edges of said sheet are folded back against said sheet.

3. In combination, a plurality of filters as claimed in claim 1, a plurality of strips forming a lattice defining a plurality of openings, releasable means for attaching one of the frame means of each filter to said lattice athwart one of said openings, and sealing means positioned between said lattice and said one frame means and compressed by said releasable attaching means.

4. A filter as claimed in claim 1 comprising corrugation supporting members seated on each frame means and projecting toward the opposite frame means and extending longitudinally of said corrugations, those supporting members on one side of said sheet being staggered with respect to those on the other side.

5. A filter as claimed in claim 1 in which the means connecting the frame means together comprises a plurality of clips, each secured to both main frame means.

6. A filter according to claim 1 in which the sheet is of cellular resiliently deformable synthetic plastic in which walls between cells have been ruptured to provide through passages for the fluid to be filtered.

7. A filter as claimed in claim 1 in which the means connecting the frame means together comprises channels between which said frame means may be located by sliding motion therealong.

8. A filter as claimed in claim 7 in which at least one of said frame means carries a coupling means so that a pair of side by side filters may be coupled for movement as a unit along said channels.

References Cited by the Examiner
UNITED STATES PATENTS

| | | | |
|---|---|---|---|
| 1,037,145 | 8/12 | Houser. | |
| 1,747,364 | 2/30 | Greene. | |
| 1,788,171 | 1/31 | Preble. | |
| 1,890,499 | 12/32 | Davies | 55—497 |
| 1,898,424 | 2/33 | Collins. | |
| 2,044,221 | 6/36 | Myers et al. | 55—483 |
| 2,074,294 | 3/37 | Woodruff | 55—500 |
| 2,077,951 | 4/37 | Myers | 55—483 |
| 2,080,154 | 5/37 | Strindberg | 55—500 |
| 2,082,481 | 6/37 | Christofferson | 55—501 |
| 2,124,370 | 7/38 | Gaarder. | |
| 2,230,765 | 2/41 | Shimer. | |
| 2,252,724 | 8/41 | Myers. | |
| 2,405,293 | 8/46 | Dahlman. | |
| 2,505,175 | 4/50 | Davis. | |
| 2,732,951 | 1/56 | Magondeau | 210—493 |
| 2,895,565 | 7/59 | Le Brun et al. | |
| 2,991,843 | 7/61 | Bell. | |

HARRY B. THORNTON, *Primary Examiner.*

REUBEN FRIEDMAN, GEORGE D. MITCHELL, WALTER BERLOWITZ, *Examiners.*